(12) United States Patent
Kishida et al.

(10) Patent No.: US 6,933,981 B1
(45) Date of Patent: Aug. 23, 2005

(54) ELECTRONIC APPARATUS AND ELECTRONIC SYSTEM PROVIDED WITH THE SAME

(75) Inventors: Ken Kishida, Ome (JP); Hiroyuki Minaguchi, Higashimatsuyama (JP); Kohei Wada, Fussa (JP); Takumi Omura, Tachikawa (JP); Hajime Kotegawa, Ome (JP); Motoki Tomita, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/539,430

(22) Filed: Mar. 30, 2000

(30) Foreign Application Priority Data

Jun. 25, 1999  (JP) .......................................... 11-179256
Jun. 25, 1999  (JP) .......................................... 11-180593

(51) Int. Cl.[7] ............................................. H04N 5/225
(52) U.S. Cl. ............... 348/375; 348/207.1; 348/207.11; 348/211.99; 348/552
(58) Field of Search ............................. 348/373, 207.1, 348/552, 211.99, 375, 207.11; D14/317, 314; 455/556.1, 556.2, 557

(56) References Cited

U.S. PATENT DOCUMENTS

| | | | | |
|---|---|---|---|---|
| 5,387,955 A | * | 2/1995 | Cocca ........................... | 396/59 |
| 5,475,441 A | * | 12/1995 | Parulski et al. .............. | 348/552 |
| 5,719,799 A | * | 2/1998 | Isashi .......................... | 708/105 |
| 5,748,441 A | | 5/1998 | Loritz et al. | |
| 5,801,919 A | | 9/1998 | Griencewic | |
| 5,880,928 A | | 3/1999 | Ma | |
| 5,973,734 A | * | 10/1999 | Anderson .................... | 348/239 |
| 6,069,648 A | * | 5/2000 | Suso et al. ................. | 348/14.02 |
| 6,160,321 A | * | 12/2000 | Shin et al. ................... | 307/66 |
| 6,366,316 B1 | * | 4/2002 | Parulski et al. ............. | 348/239 |
| 6,690,417 B1 | * | 2/2004 | Yoshida et al. ........... | 348/231.1 |
| 6,697,117 B1 | * | 2/2004 | Park ........................... | 348/373 |

FOREIGN PATENT DOCUMENTS

| | | |
|---|---|---|
| JP | 2-159888 | 6/1990 |
| JP | 5-265927 | 10/1993 |
| JP | 6-178178 | 6/1994 |
| JP | 7-210580 | 8/1995 |
| JP | 8-22343 | 1/1996 |
| JP | 8-95670 | 4/1996 |
| JP | 8-211978 | 8/1996 |
| JP | 9-167031 | 6/1997 |
| JP | 9-222936 | 8/1997 |
| JP | 10-51665 | 2/1998 |
| JP | 3048543 | 2/1998 |
| JP | 10-65859 | 3/1998 |
| JP | 10-164414 | 6/1998 |
| JP | 10-271376 | 10/1998 |
| JP | 11-53060 | 10/1998 |
| JP | 11-161373 | 6/1999 |

* cited by examiner

*Primary Examiner*—Andrew Christensen
*Assistant Examiner*—Heather R. Long
(74) *Attorney, Agent, or Firm*—Finnegan, Henderson, Farabow, Garrett & Dunner, L.L.P.

(57) ABSTRACT

A camera is detachably attached to the central portion of the rear end of an apparatus main body of a personal computer and positioned between a pair of hinge portions. A lens is provided at the camera main body of the camera and this camera main body is rotatably arranged about the axis of the camera main body substantially coaxial with the rotation axis of a display unit. When the camera main body is detached from the apparatus main body, the camera is connected to the apparatus main body through an extension adapter and put at a remote position from the personal computer. A shutter button is provided at each of the camera main body and the apparatus main body.

20 Claims, 13 Drawing Sheets

ELECTRONIC APPARATUS AND ELECTRONIC SYSTEM PROVIDED WITH THE SAME

CROSS-REFERENCE TO RELATED APPLICATIONS

This application is based upon and claims the benefit of priority from the prior Japanese Patent Applications No. 11-179256, filed Jun. 25, 1999; and No. 11-180593, filed Jun. 25, 1999, the entire contents of which are incorporated herein by reference.

BACKGROUND OF THE INVENTION

The present invention relates to an electronic apparatus such as a portable personal computer, and to an electronic system provided with the same.

Compact portable computers, such as a notebook-type personal computer or a so-called mobile computer, have widely been used in recent years. The computer of this type is increasingly required to make an apparatus main body smaller to improve portability and, at the same time, to have further improved performance and realize multifunction.

To realize multifunction, there is provided a personal computer of this type equipped with a small camera, capable of instantly displaying an image picked up by this camera and storing the image as data.

Generally, the portable computer comprises a main body equipped with a keyboard and the like, and a display unit mounted on the main body to be freely opened/closed. The camera is attached at the free end of the display unit and provided so that the direction of the camera is adjustable.

In case of a computer equipped with the camera arranged at the display unit as stated above, however, the camera is moved according to the opening/closing of the display unit. Due to this, the image pickup range of the camera is changed in accordance with the angle with which the display is opened and the direction of the camera must be adjusted according to the change of the pickup range.

Further, since the camera is provided at the display unit, wirings extending from the camera are introduced into the computer main body and connected to a control circuit through the hinge portions of the display unit. In this case, the wirings of the display unit per se are also introduced into the computer main body through the hinge portions. The number of wirings passing through the hinge portions is thereby increased, with the result that it becomes difficult to lead the wirings and to arrange them for space reasons.

Moreover, the above-stated computer is useful when a computer operator, i.e., a person who faces and an object which can face the computer are photographed. However, when an object which is difficult to face with the computer, such as a fixed object, is photographed, it is necessary to move the computer main body to adjust the direction thereof toward the to-be-photographed object. The photographic operation, therefore, becomes disadvantageously quite laborious.

The portable electronic apparatus of this type is desired to further enlarge the application range thereof and to further improve operability by making the apparatus multifunctional.

BRIEF SUMMARY OF THE INVENTION

The present invention has been contrived in consideration of the above circumstances, and its object is to provide an electronic apparatus having excellent operability and multifunction, and to provide an electronic system provided with the electronic apparatus.

To attain the above object, an electronic apparatus according to the present invention comprises an apparatus main body having a rear end portion provided with a pair of hinge portions; a display unit rotatably supported by the hinge portions; and a camera arranged at a central portion of a rear end of the apparatus main body between the pair of hinge portions. The camera has a lens which position is adjustable about a central axis substantially coaxial with a rotation axis of the display unit.

According to the electronic apparatus constituted as stated above, since the camera is provided at the apparatus main body, it is possible to photograph an object with the camera, to display the image of the object on the display unit and to capture the image into the apparatus main body as a snap image. Further, by providing the camera at the apparatus main body, the camera is not moved even when the display unit is opened/closed and it is not necessary to adjust the image pickup range of the camera according to the opening/closing angle of the display unit. This can make the electronic apparatus multifunctional and improve operability thereof. Besides, unlike a case where the camera is provided at the display unit, it is not necessary to lead wirings extending from the camera from the display unit into the apparatus main body through the hinge portions, whereby assembly efficiency can be improved and efficiency for using space can be improved.

Furthermore, since the camera is provided at the central portion of the rear end of the apparatus body, the camera is positioned in front of the operator of the electronic apparatus. Thus, even when the operator is photographed by the camera while using the electronic apparatus, it is not necessary to move the entire electronic apparatus in accordance with the operator as a object, thereby making it possible to improve operability.

Moreover, an electronic system according to the present invention comprises:

an electronic apparatus including an apparatus main body having a rear end portion provided with a pair of hinge portions, and a display unit rotatably supported by the hinge portions, and a camera detachably provided at a central portion of a rear end of the apparatus main body between the pair of hinge portions; and an extension adapter for connecting the camera detached from the apparatus main body to the apparatus main body, and arranging the camera at a position remote from the apparatus main body.

According to the electronic apparatus system constituted as stated above, the camera is connected to the apparatus main body through the extension adapter after being detached from the apparatus main body. This makes it possible to utilize the camera as a handy camera and to put the camera at a remote position from the electronic apparatus. Thus, the camera can be put closer to an object and only the camera can be adjusted and arranged in an arbitrary direction without changing the direction of the electronic apparatus. It is also possible to easily photograph various types of objects. Besides, the electronic apparatus can be utilized as a system in more varied manner and the application range of the system can be enlarged due to making the system multifunctional.

Moreover, according to the present invention, a shutter button is provided on the apparatus main body, and another shutter button is also provided at the camera, thereby making it possible to issue an image pickup command from the camera. The shutter button of the camera is arranged at a position at which the button cannot be operated externally when the camera is directly connected to the apparatus main body. Due to this, the two shutter buttons of the camera and the apparatus main body do not simultaneously issue image pickup commands, and it is, therefore, possible to prevent erroneous operation.

According to the electronic apparatus system of the present invention, the camera is rotatable from a position at which the camera faces a front side of the apparatus main body toward a position at which the camera faces a rear side of the apparatus main body, in a range of about 180 degrees; the camera has a direction sensor for detecting that the camera has been rotated toward a predetermined rotation position; and the apparatus main body has a control section for turning image data picked up by the camera upside down according to detection of the direction switch while the camera is directly connected to the apparatus main body. Thus, the image which has been picked up is not reversed, irrespectively of the rotation direction of the camera.

Further, when the camera is connected to the apparatus main body through the extension adapter, the extension adapter is formed to turn the direction sensor and the control section into a non-connection state. Thus, when the camera is used with being detached from the apparatus main body, the picture which has been picked up is not inadvertently reversed and improved operability can be realized.

According to the electronic apparatus of the present invention, the apparatus main body has a pull-up voltage circuit; and the camera has a ground terminal connected to the pull-up voltage circuit through a signal line when the camera is connected to the apparatus main body directly or through the extension adapter.

Thus, even when the camera is connected to the apparatus main body directly or through the extension adapter and the extension adapter is connected to the apparatus main body but the camera is not connected to the extension adapter, it is possible to ensure detecting whether or not the camera is connected to the apparatus main body.

Moreover, an electronic system according to the present invention comprises:

an electronic apparatus including an apparatus main body having a rear end portion provided with a pair of hinge portions, a display unit rotatably supported by the hinge portions, and a camera detachably provided at a central portion of a rear end of the apparatus main body and positioned between the pair of hinge portions; and a remote controller detachably connected to the apparatus main body, for remote-controlling the electronic apparatus.

According to the electronic system constituted as stated above, the electronic apparatus can be remote-controlled by the remote controller connected to the apparatus main body. That is, by operating the remote controller, it is possible to execute an application at a remote position from the electronic apparatus or to execute photographing of an object, snap shot or the like at a remote position by using the remote controller while the apparatus main body provided with the camera is put closer to the object. This can improve the operability of the small size electronic apparatus, to utilize the electronic apparatus as a system in various manners, to make the system further multifunctional and to further enlarge the application range of the system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 15 show an electronic apparatus system according to an embodiment of the present invention;

FIG. 1 is a perspective view of a personal computer in the system;

FIG. 2 is a perspective view of the personal computer in a stated in which a display unit is closed, viewed from the back side thereof;

FIG. 4 is an exploded perspective view showing the rear end portion of the personal computer, the camera and the extension adapter;

FIG. 5 is a perspective view of the camera-side adapter of the extension adapter;

FIG. 6 is a perspective view showing a state in which the camera is connected to the personal computer using the extension adapter;

FIG. 7 is an exploded perspective view showing part of the personal computer and the remote controller;

FIG. 8 is a perspective view showing the reverse side of the controller main body of the remote controller;

FIG. 9 is a schematic perspective view showing a state in which the personal computer, the extension adapter and the remote controller are mutually connected to use them as a system;

FIG. 10 is a system block diagram of the personal computer system;

FIG. 11 is a partial block diagram of the personal computer relating to the remote controller;

FIG. 13 is a block diagram of the remote controller;

FIG. 14 is a functional block diagram in case of directly connecting a camera to the personal computer; and FIG. 15 is a functional block diagram in case of indirectly connecting the camera to the personal computer through the extension adapter.

DETAILED DESCRIPTION OF THE INVENTION

A system provided with a portable personal computer according to an embodiment of the present invention will be described hereinafter in detail with reference to the accompanying drawings.

Figure 1:
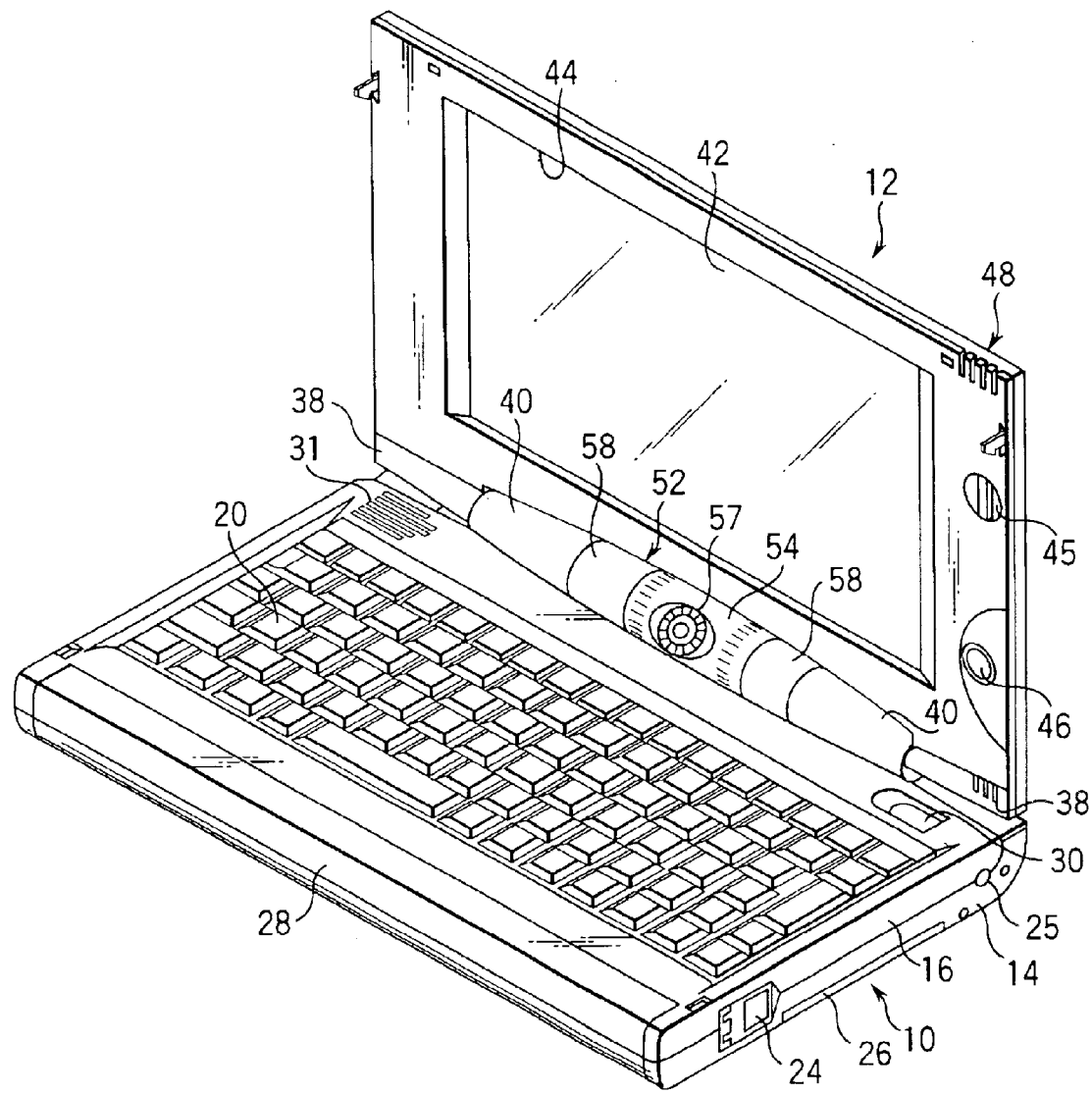
Figure 2:
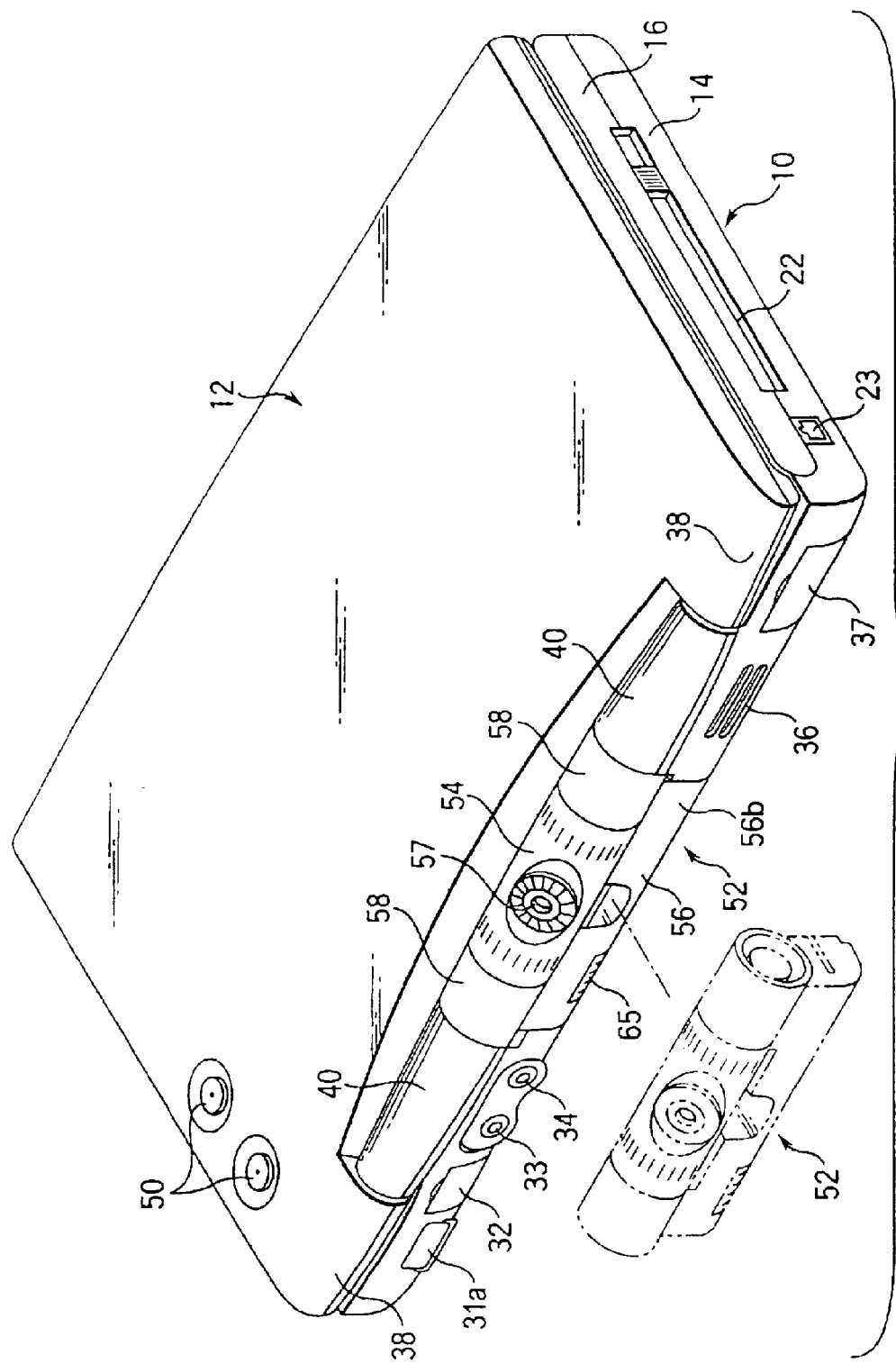

As shown in FIGS. 1 and 2, a personal computer has a flat, rectangular box-shaped apparatus main body 10 and a flat, rectangular display unit 12. The apparatus main body 10 is comprised of a lower case 14 of rectangular box shape having an upper opening and a cover 16 attached to the lower case 14 so as to covet the upper opening thereof.

The apparatus main body 10 has a keyboard 20 exposed to the upper surface of the cover 16. At a side surface of the main body 10 are provided with a card slot 22 into which a PC card can be inserted and a DC power supply connector 23. At the other side surface of the main body 10 are provided a telephone line connection jack 24, a remote controller connector 25, a smart media insertion port 26 and the like.

A battery 28 is detachably attached on the front end portion of the apparatus main body 10. Further, a camera shutter button 30 to be described later and a speaker 31 are provided on the rear end portion of the upper surface of the cover 16. Further, an infrared port 31a, a USB connector 32, a microphone input terminal 33, a headphone jack 34, cooling air discharge holes 36, an external display output terminal 37 and the like are provided on the rear surface of the apparatus main body 10.

The display unit 12 has a pair of leg portions 38 protruding from the both ends of the lower end portion of the display unit 12, respectively. These leg portions 38 are rotatably supported by a pair of hinge portions 40 provided on the rear end portion of the cover 16. Each of the hinge portions 40 has a hinge axis (not shown) extending substantially in parallel to the upper surface of the cover 16, and defines the rotation axis of the display unit 12. Thus, the display unit 12 is mounted on the apparatus main body 10 to be freely opened/closed between a rotated position shown in FIG. 1 at which the keyboard 20 is exposed and a closed position shown in FIG. 2 at which the display unit 12 covers the keyboard 20 and the unit 12 together with the apparatus main body 10 constitutes a box shape. The outer surfaces of the respective hinge portions 40 are covered with separate decorative laminated covers.

On the inner surface of the display unit 12 are provided an opening 44 to which a liquid crystal display panel 42 is exposed, a power supply switch 45, a rib point 46 and an indicating section 48 formed of LEDs, and the like. Also, on the outer surface of the display unit 12, a pair of click switches 50 are arranged to face the rib point 46.

On the other hand, the personal computer includes a camera 52 detachably provided on the rear end portion of the apparatus main body 10 as shown in FIGS. 1 to 3B. This camera 52 is arranged between the paired hinge portions 40, that is, at the center of the rear end portion of the apparatus main body 10.

To be specific, the camera 52 has a camera main body 54 and a base portion 56 supporting the camera main body 54. The camera main body 54 has a charge-coupled device (CCD) (not shown) housed therein, and a lens 57 which can be focus-adjusted manually and the main body 54 is formed to be substantially cylindrical. The lens 57 is provided such that an incident surface thereof is exposed to an outer periphery of the camera main body 54.

The base portion 56 has a pair of support sections 58 positioned at both axial ends of the camera main body 54, respectively. The camera main body 54 is supported by these support sections 58 to be rotatable about the central axis of the camera main body 54 by about 180°. The paired support sections 58 are formed in a cylindrical shape having the same diameter as that of the camera main body 54 and to be continuous to the camera main body 54. A camera-side shutter button 60 is provided on the end surface of one of the support sections 58.

The base portion 56 has a flat inner wall 56a, a curved outer wall 56b and a pair of flat side walls 56c. On the inner wall 56a are provided a connector (camera-side connector) 62 electrically connected to the camera main body 54 and a hook 64 freely reciprocating in the direction parallel to the central axis of the camera main body 54. In addition, an operation lever 65 for releasing the hook 64 functioning as a holding member is provided on the outer wall 65b and guide grooves 66 for guiding the attachment/detachment of the camera 52 are formed on the respective side walls 56c.

Figure 3A:
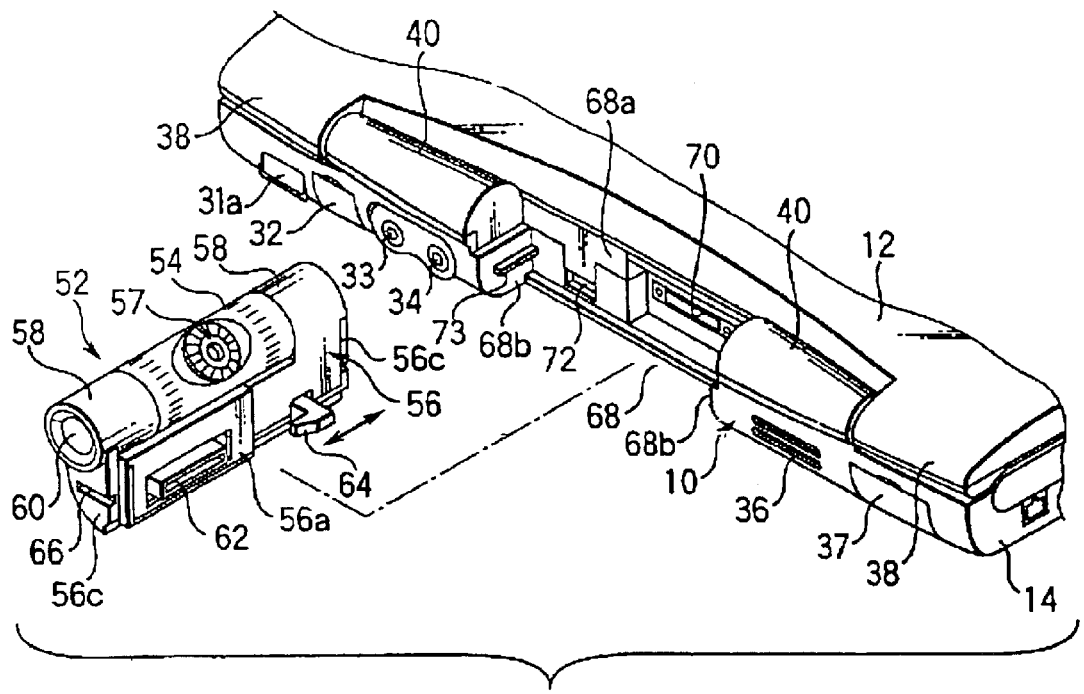
FIG. 3A is an exploded perspective view showing the rear end portion of the personal computer and the camera.

As shown in FIG. 3A, a camera attachment portion 68 defined by a recess which is opened in a backward direction, is formed at the center of the rear end portion of the apparatus main body 10 and positioned between the paired hinge portions 40. A main body-side connector 70 is exposed to the bottom wall 68a of the camera attachment portion 68. The bottom wall 68a has an engagement hole 72 to be engaged with the hook 64 of the camera 52. The main body-side connector 70 is mounted on a main printed circuit board (not shown) arranged in the apparatus main body 10.

Guide ribs 73 functioning as guide sections are formed on a pair of side walls 68b of the camera attachment portion 68, respectively, and extend in the orthogonal direction to the bottom wall 68a, i.e., in the direction perpendicular to the rear surface of the apparatus main body 10.

In the case of fitting the camera 52 into the camera attachment portion 68 of the apparatus main body 10, a pair of guide grooves 66 formed in the base portion 56 of the camera 52, respectively, are engaged with guide ribs 73 at the camera attachment portion side to thereby push the camera 52 into the camera attachment portion 68 in the direction perpendicular to the rear surface of the apparatus main body. Then, the camera-side connector 62 is connected with the connector 70 of the apparatus main body 10 and the hook 64 is engaged with the engagement hole 72. As a result, the camera 52 is attached into the camera attachment portion 68, mechanically held in the camera attachment portion by the hook 64, and electrically connected to the apparatus main body 10 through the connectors 62 and 70.

As shown in FIGS. 1 and 2, while the camera 52 is attached in the camera attachment portion 68, the cylindrical camera main body 54 and the cylindrical paired support sections 58 are positioned to be continuously aligned with the paired hinge portions 40 of the apparatus main body 10. Further, the rear wall 56b of the base portion 56 is positioned to be flush with the rear surface of the apparatus main body 10 and constitutes part of the rear surface of the apparatus main body 10. In this state, the camera side shutter bottom 60 provided at the support section 58 is at a position at which the button 60 cannot be operated externally, thereby making it possible to prevent erroneous operation.

Figure 3B:
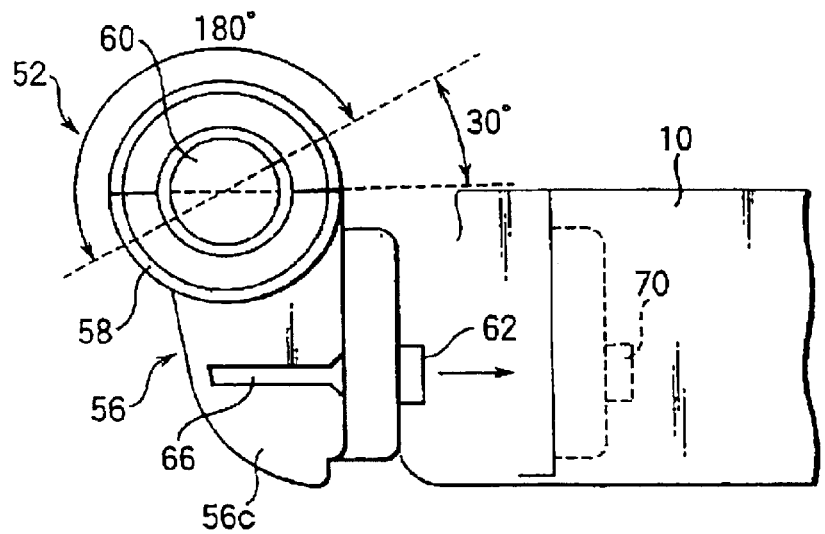
FIG. 3B is a side view showing the rear end portion of the personal computer and the camera.

Furthermore, the central axis of the camera main body 54 is positioned substantially coaxially with the hinge axes of the hinge portions 40, i.e., with the rotation axis of the display unit 12, and is rotatable about this central axis by about 180°. As shown in FIG. 3B, while the camera 52 is attached to the camera attachment portion 68, the camera main body 54 can be rotated in the same direction as that of the display unit 12 with in a range of the angle of about 30 to 210 degrees, which is defined between the upper surface of the apparatus main body 10 and the optical axis of the lens 57.

The direction of the lens 57 is adjusted by rotating the camera main body 54, whereby it is possible to photograph an arbitrary image using the camera 52 whether the display unit 12 is opened or closed. The image photographed by the camera 52 can be displayed as a motion image or a still image on the display unit 12. Also, by depressing the main body-side shutter bottom 30, the motion or still image can be captured in a memory in the apparatus main body 10.

Meanwhile, in the case of detaching the camera 52 from the apparatus main body 10, the overall camera 52 is pulled out backward while the operation lever 65 is operated to release hook 64.

The personal computer constituted as stated above may be used together with an extension adapter 74 and a remote controller 100 to be described later, thereby making it possible to use the personal computer as an electronic apparatus system in wider application range.

Figure 4:
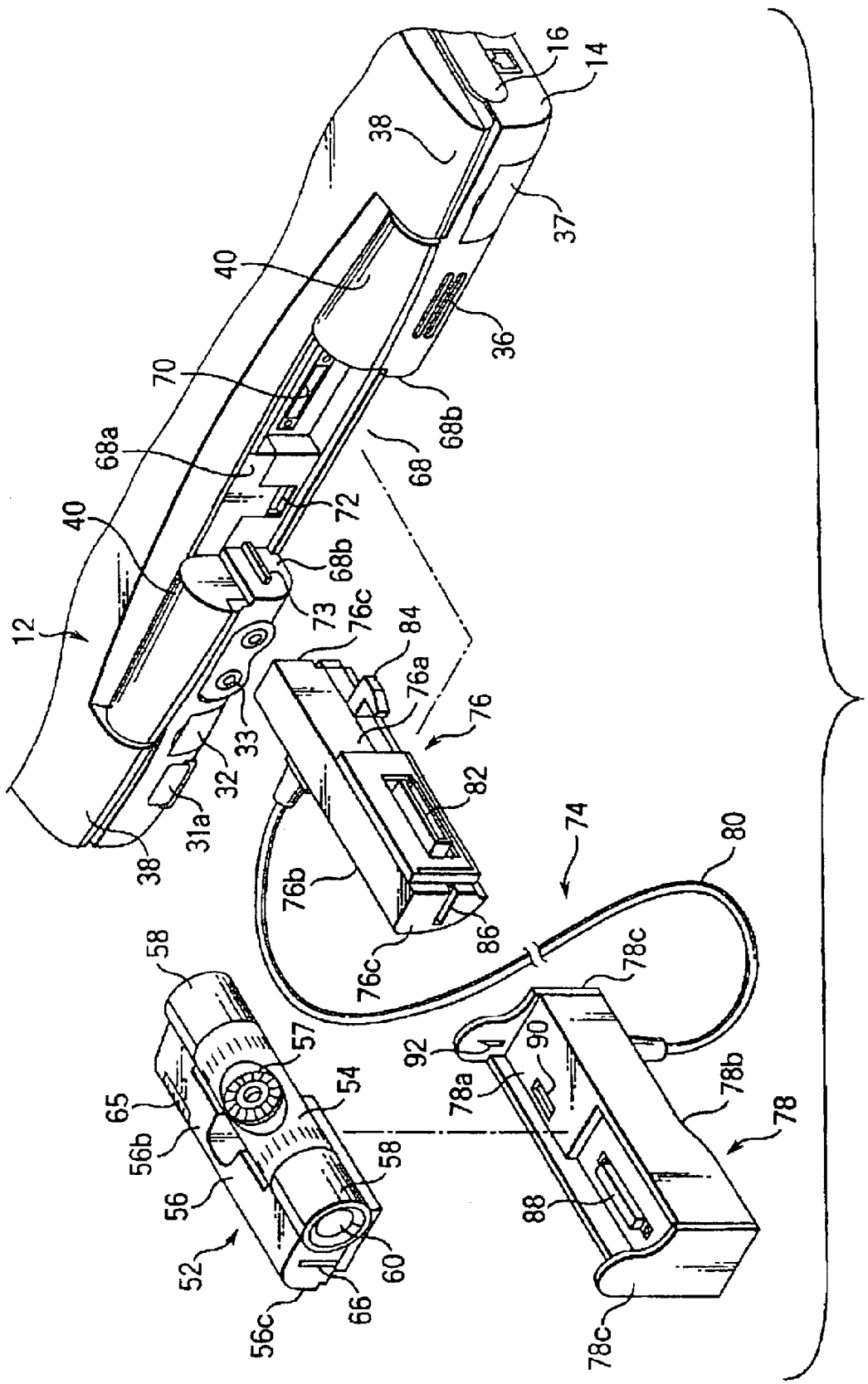
Figure 5:
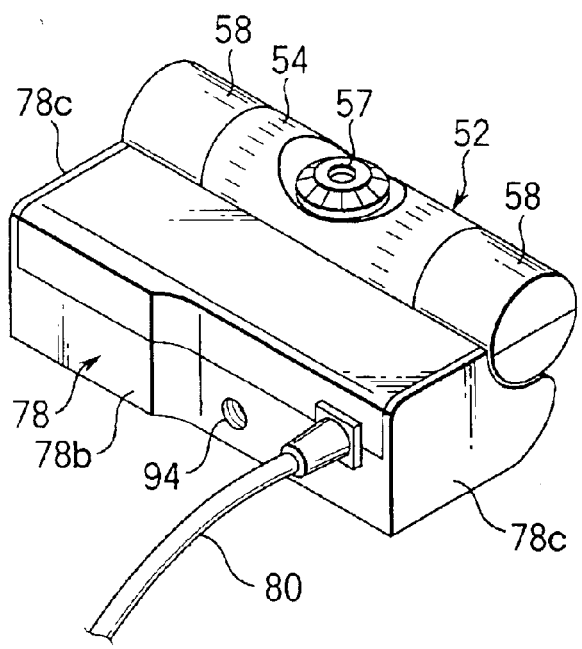
Figure 6:
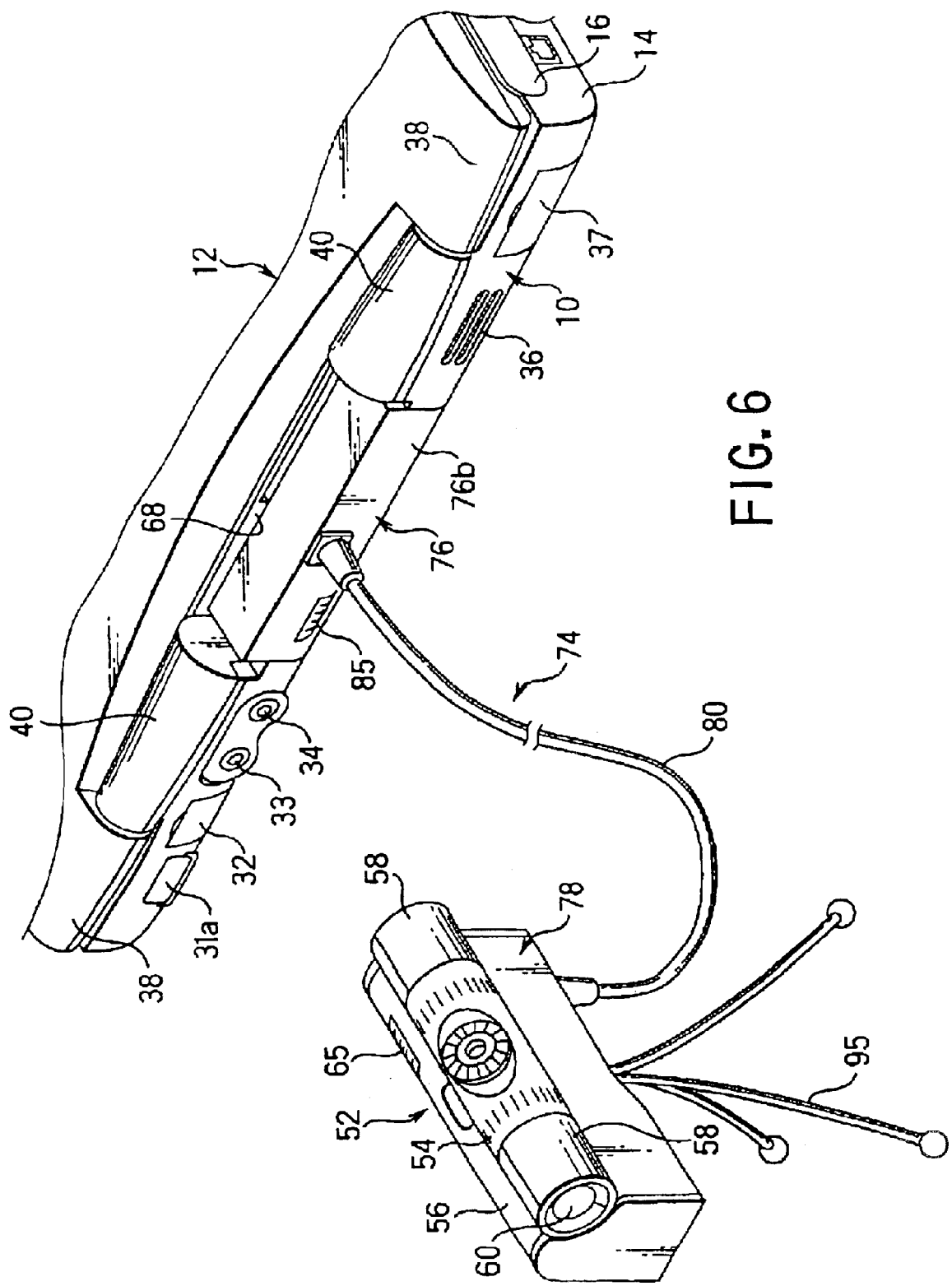

Namely, as shown in FIGS. 4 to 6, the camera 52 can be used to put at a remote position from the apparatus main body 10 by employing the extension adapter 74. This extension adapter 74 comprises a main body-side adapter 76, instead of the camera 52, which can be attached into the camera attachment portion 68 of the apparatus main body 10, a camera-side adapter 78 into which the camera 52 detached from the apparatus main body 10 is fitted, and an elongate connection cable 80 connecting the adapters 76 and 78.

The main body-side adapter 76 is formed in a box like shape and has a flat inner wall 76a, a curved outer wall 76b and a pair of flat side walls 76c. A connector (first adapter-side connector) 82 electrically connected to the cable 80 and a reciprocatable hook 84 functioning as a holding member are disposed to be aligned with each other on the inner wall 76a. The connector 82 and the hook 84 are formed to have the same shapes and same positional relationship as those of the connector 62 and the hook 64 of the camera 52. An operation lever 85 for releasing the hook 84 is provided on the outer wall 76b. Guide grooves 86 for guiding the attachment/detachment of the main body-side adapter 76 are formed on the respective side walls 76c. The connection cable 80 extends from the outer wall 76b.

The camera-side adapter 78 is formed to be rectangular box-shaped and has an upper wall 78a, a bottom wall 78b and a pair of side walls 78c all of which are generally flat. A connector (second adapter-side connector) 88 electrically connected to the connection cable 80 and an engagement hole 90 engageable with the hook 64 of the camera 52 are provided to be aligned with each other on the upper wall 78a. The connector 88 and the engagement hole 90 are formed to have the same shapes and the same positional relationship as those of the connector 70 and the engagement hole 72 provided at the camera attachment portion 68 of the apparatus main body 10.

The upper end portions of the paired side walls 78c protrude from the upper wall 78a and guide ribs 92 extending perpendicularly to the upper wall 78a and functioning as guide sections are formed on the inner surfaces of the side walls 78c, respectively. Further, a threaded hole 94 for attaching a deformable tripod 95 is bored in the bottom wall 78b. The connection cable 80 extends from the bottom wall 78b.

In case of disposing the camera 52 remotely from the personal computer by employing the above-stated extension adapter 74, the camera 52 is first detached from the camera attachment portion 68 of the apparatus main body 10 according to the above-described operation as shown in FIGS. 3A and 3B. Next, as shown in FIGS. 4 and 6, the main body-side adapter 76, instead of the camera 52, is attached into the camera attachment portion 68. In this case, while the paired guide grooves 86 provided on the respective side walls 76c of the main body-side adapter 76 are engaged with the guide ribs 73 of the camera attachment portion 68, the main body-side adapter 76 is forced into the camera attachment portion 68 in the direction perpendicular to the rear surface of the apparatus main body 10. Then, the connector 82 of the main body-side adapter 76 is fitted to the connector 70 of the apparatus main body 10 and the hook 84 is engaged with the engagement hole 72. As a result, the main body-side adapter 76 is attached into the camera attachment portion 68, mechanically held into the camera attachment portion 68 by the hook 84, and electrically connected to the apparatus main body 10 through the connectors 82 and 70.

Next, the camera 52 thus detached is attached to the camera-side adapter 78. In this case, while engaging the paired guide grooves 66 of the camera 52 with the guide ribs 92 of the camera-side adapter 78, the camera 52 is forced into the camera-side adapter 78 in the direction perpendicular to the upper wall of the camera-side adapter 78. Then, the camera-side connector 62 is fitted to the connector 88 of the camera-side adapter 78 and the hook 64 is engaged with the engagement hole 90. As a result, the camera 52 is attached into the camera-side adapter 78, mechanically held by the hook 64 and electrically connected to the camera-side adapter 78 through the connectors 62 and 88.

By performing the operation as stated above, the camera 52 can be electrically connected to the personal computer through the extension adapter 74. In addition, by attaching a tripod 95 at the camera-side adapter 78 and disposing the adapter 78 at an arbitrary position, the camera 52 can be used while being put at a remote position from the personal computer. In this case, too, an image photographed by the camera 52 can be displayed as a motion picture or a still image on the display unit 12. Also, by depressing either the main body-side shutter button 30 or the shutter button 60 of the camera 52, the image can be captured as a snap image in the memory in the apparatus main body 10.

It is noted that the camera-side adapter 78 may be directly put on a desk, a floor or the like without use of the tripod 95.

Figure 8:
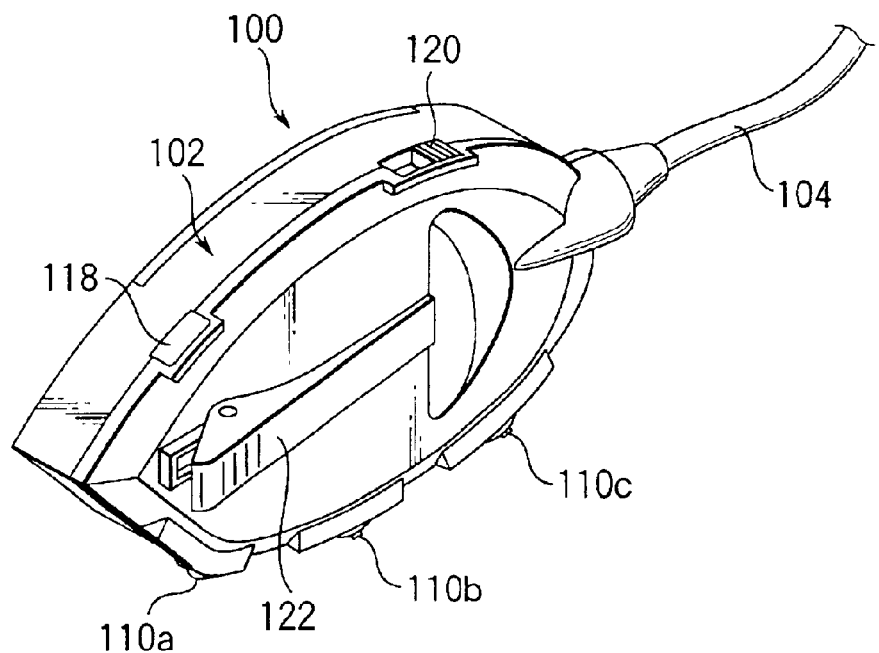
Figure 7:
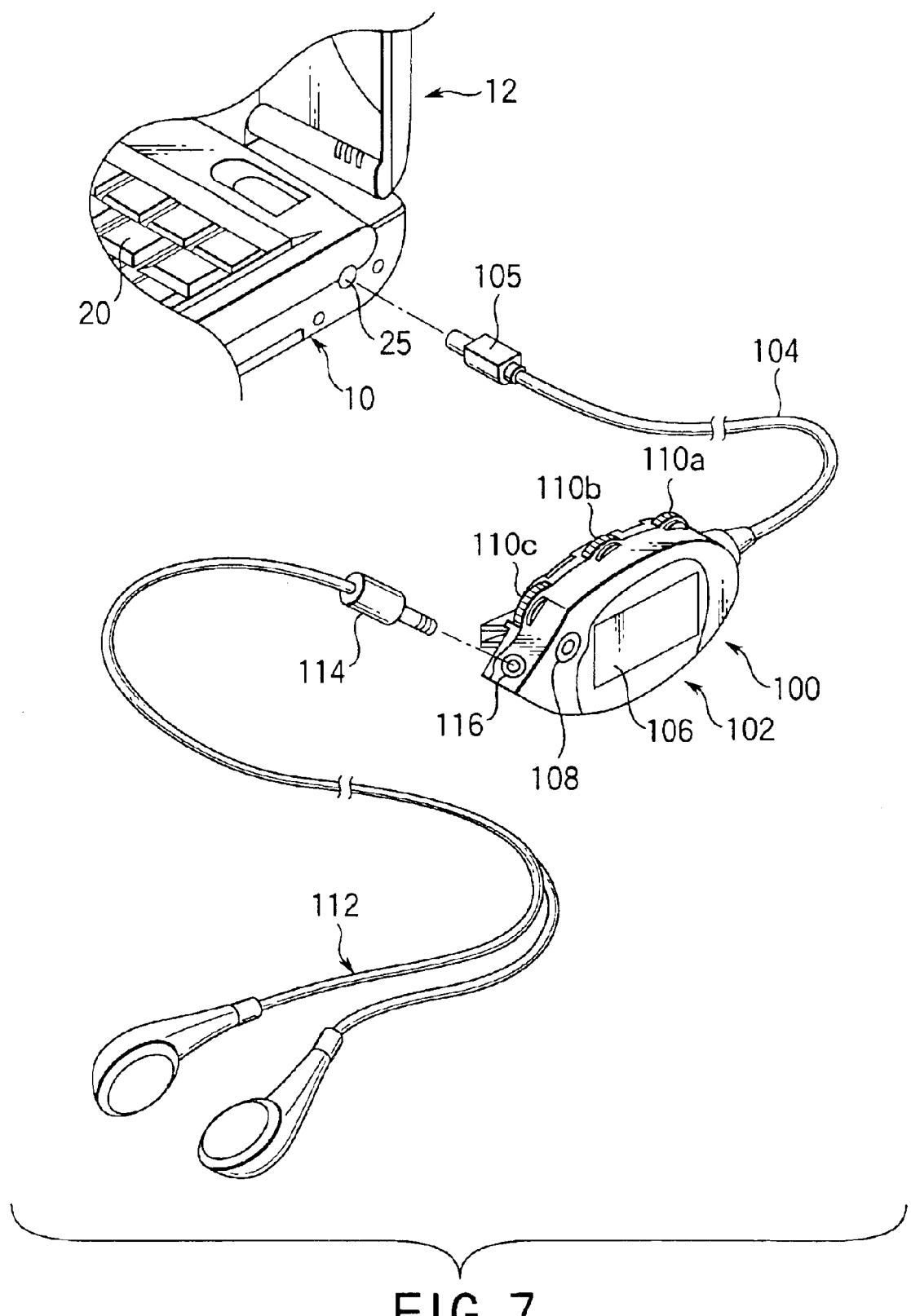

In the meantime, as shown in FIGS. 7 and 8, the remote controller 100 for remote-controlling the personal computer has a generally ellipsoidal controller main body 102 and a connection cable 104 extending from the controller main body 102. A connection plug 105 connectable to the connector 25 provided at the apparatus main body 10 of the personal computer is provided on the extended end of the connection cable 104.

On the controller main body 102 are provided a substantially rectangular liquid crystal display section 106 which can display 10×3 characters and display various information, and a shutter button 108. First, second and third jog dials 110a, 110b and 110c aligned with one another and a headphone jack 116 connectable to the connection plug 114 of a headphone 112 are provided on the upper side surface of the controller main body 102. Each of the jog dials 110a, 110b and 110c is constituted to be rotation-controlled and depression operated. When rotated, the jog dials select and adjust items and when depressed, they determine the selected items.

A power supply switch and a hold lever 120 are provided on the lower side surface of the controller main body 102. Further, a rockable cramp lever 122 for attaching and holding the controller main body 102 to clothes, a shoe or the like is provided on the rear surface of the controller main body 102.

In case of employing the remote controller 100, the connection plug 105 is inserted into the connector 25 provided at the apparatus main body 10 of the personal computer. Then, the remote controller 100 is electrically connected to the personal computer by plug-in play.

The remote controller 100 has the following functions. The first jog dial 110a is rotated laterally, thereby setting an application such as a media player, an explorer or the like, setting the volume of the selected application, selecting camera photographing, snap shot or the like. The selected application or the like is displayed on the liquid crystal display section 106. By depressing the first jog dial 110a in a state in which an arbitrary item is selected, the selected item is determined and registered in the liquid crystal display section 106.

After the determination of the selected item, the first jog dial 110a is rotated, to thereby allow making a volume adjustment or the like. Further, by depressing the shutter button 108 of the controller main body 100 in a state in which either camera photographing or snap shot is selected, the image photographed by the camera 52 of the personal computer can be captured in the memory in the apparatus main body 10 as a snap image.

The second jog dial 1120b is rotated laterally in a state in which the media player, for example, is selected, a song number is selected and the selected number is displayed on the liquid crystal display section 106. After selection, the second jog dial 110b is depressed, to thereby determine the selected number.

The third jog dial 110c is rotated laterally in a state in which the media player, for example, is selected, one of the play, repeat, FF, REW, disk change modes and the like is selected and the selected mode is displayed on the liquid crystal display section 106. After selection, the third jog dial 110c is depressed, to thereby determine the selected mode.

Further, by inserting the connection plug 114 into the headphone jack 102 of the controller main body 102 and connecting the headphone 112 to the controller main body 102, it is possible for a user to listen to sound such as music with the headphone 112 while the controller main body is remote-controlling the personal computer.

Figure 9:
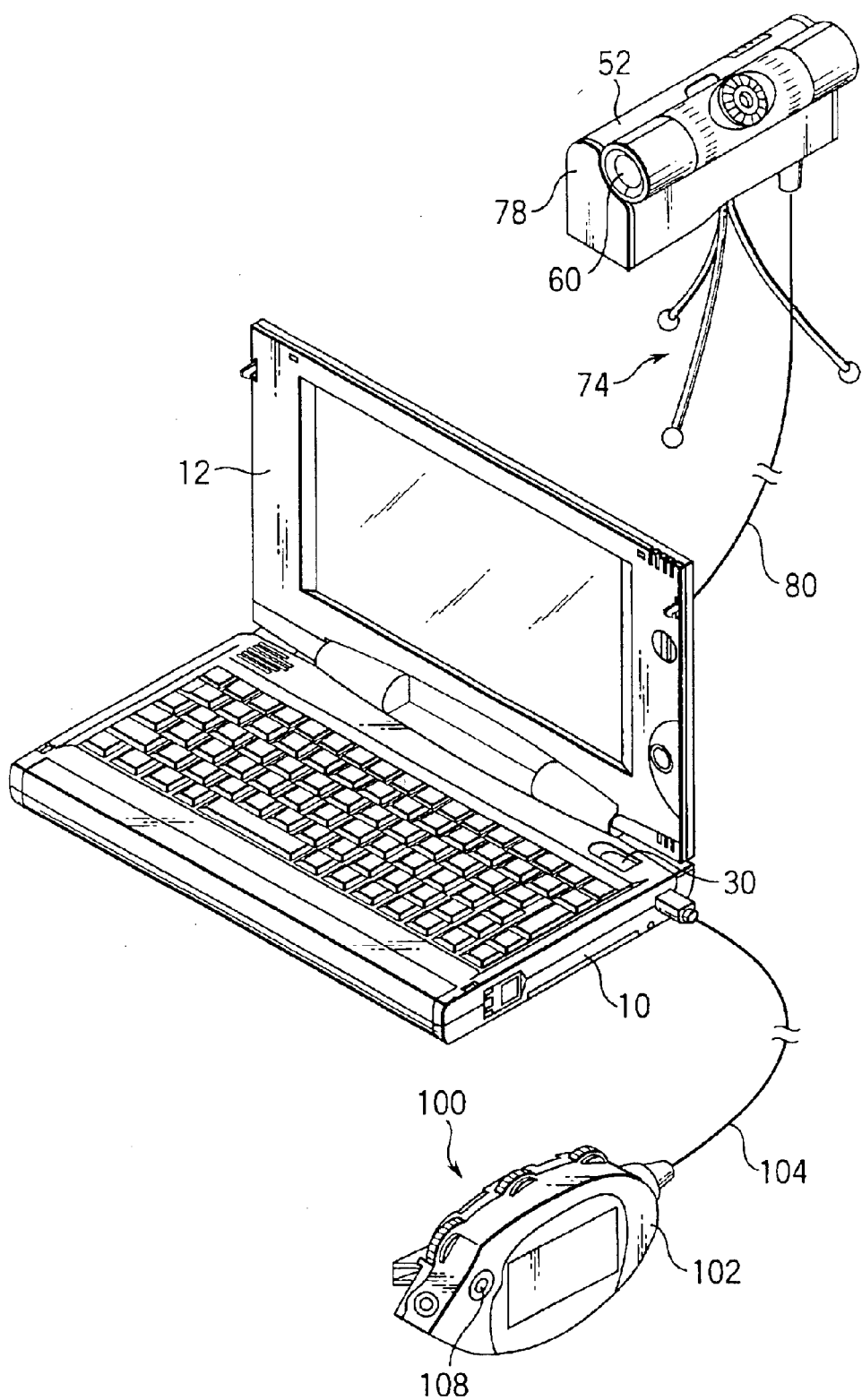

Moreover, as shown in FIG. 9, it is possible to use both the extension adapter 74 and the remote controller 100. Namely, the camera 52 detached from the apparatus main body 10 of the personal computer is connected to the personal computer using the extension adapter 74 and put in the vicinity of an arbitrary object. Also, the remote controller 100 is connected to the personal computer.

In case of photographing an object, the controller main body 102 of the remote controller 100 is operated to thereby select, for example, either photographing with a camera or snap shot. By doing so, an object image picked up by the camera 52 is displayed on the display unit 12 of the personal computer. When a snap image is captured in the memory of the personal computer, the shutter button 108 provided at the controller main body 102 is depressed while checking the image displayed on the display unit 12 and a desired image can be thereby captured in the memory.

When both the extension adapter 74 and the remote controller 100 are used, the camera 52 is placed to be close to the object and remote-controlled by the remote controller 100. By doing so, it is possible to operate the camera 52 and the personal computer at a position quite remote from the object, to further improve operability and to further enlarge the application range of the computer.

Next, the internal configurations of the personal computer (to be referred to as "PC1" hereinafter), the camera 52 and the remote controller 100 will be described in detail.

Figure 10:
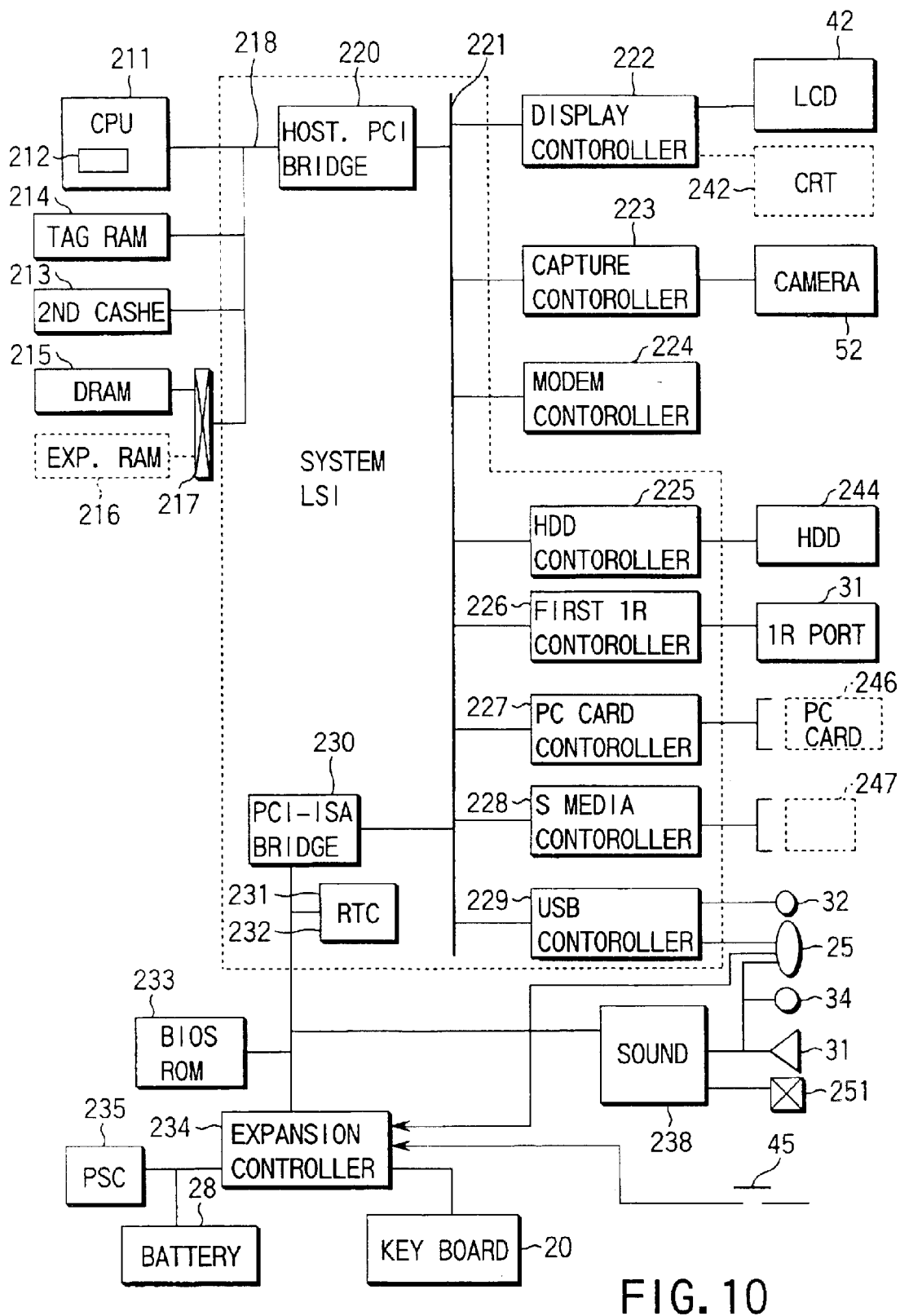

FIG. 10 is a system block diagram of the PC1. A CPU 211 including a primary cache memory 212, a secondary cache memory 213 and a TAG RAM 214 storing information for determining whether or not target data to be accessed exist in the primary cache memory 212 and the secondary cache memory 213, are connected to a HOST-PCI bridge controller 220 through a local bus 218. A DRAM 215 constituting the main memory of the PC1 and an extended RAM 216 are also connected to the HOST-PIC bridge controller 220 through a memory slot 217.

The HOST-PIC bridge controller 220 is connected to a PCI bus 221 and controls communication between respective devices on a local bus 218 and those on the PCI bus 221. A display controller 222 for controlling the display of a liquid crystal display 42 provided at the display unit 12, an external CRT 242 and the like, a video capture controller 223 for controlling the capture of data inputted from the camera 52 and the like, a modem controller 224 for controlling communication with other computers or the like using a LAN, a telephone line or the like, an HDD controller 225 for controlling an HDD 244, a high-speed IR controller 226 for controlling high-speed infrared communication with other computers and the like through an infrared port 31, a PC card controller 227 for controlling a detachable PC card 246, a smart media controller 228 for controlling a small size low volatile memory card (e.g., smart media) which is increasingly spreading, and the like are connected to the PCI bus 221.

Further, a USB controller 229 for controlling data transmission/reception by means of USB (universal serial bus) standardized and serially connectable with various types of external units, is connected to the PCI bus 221. The USB controller 229 has two ports as input/output ports with external units. One of the two port is employed while being connected to an ordinary USB connector 32. The other port is employed together with other signal lines or the like while being connected to the remote controller connector 25.

A PCI-ISA bridge controller 230 is a control circuit for connecting the PCI bus 221 and the ISA bus 231. An RTC (real time clock) circuit 232, a BIOS-ROM 233 for storing BIOS (basic input/output system), a power supply microcomputer 235 for controlling the keyboard 20, supply of power to the system, charge-discharge of the battery 28 and the like, an extended, controller 234 having functions including communication, and a sound controller 238 converting sound data into sound, sound into sound data and the like, are connected to the ISA bus 231.

In response to the depression of the power supply switch 45 of the PC1, the extended controller 234 functions to notify the power supply microcomputer 235 of the depression thereof and also detects that a power supply switch 118 from the remote controller 100 is depressed. The output of the sound controller 238 is selectively supplied to the speaker 31, the remote controller connector 25 and the headphone jack 34. This selection operation will be described later. It is noted that reference symbol 251 denotes a microphone.

A system LSI is constructed by a portion centered around the PCI bus 221 and enclosed by a dotted line.

Figure 11:
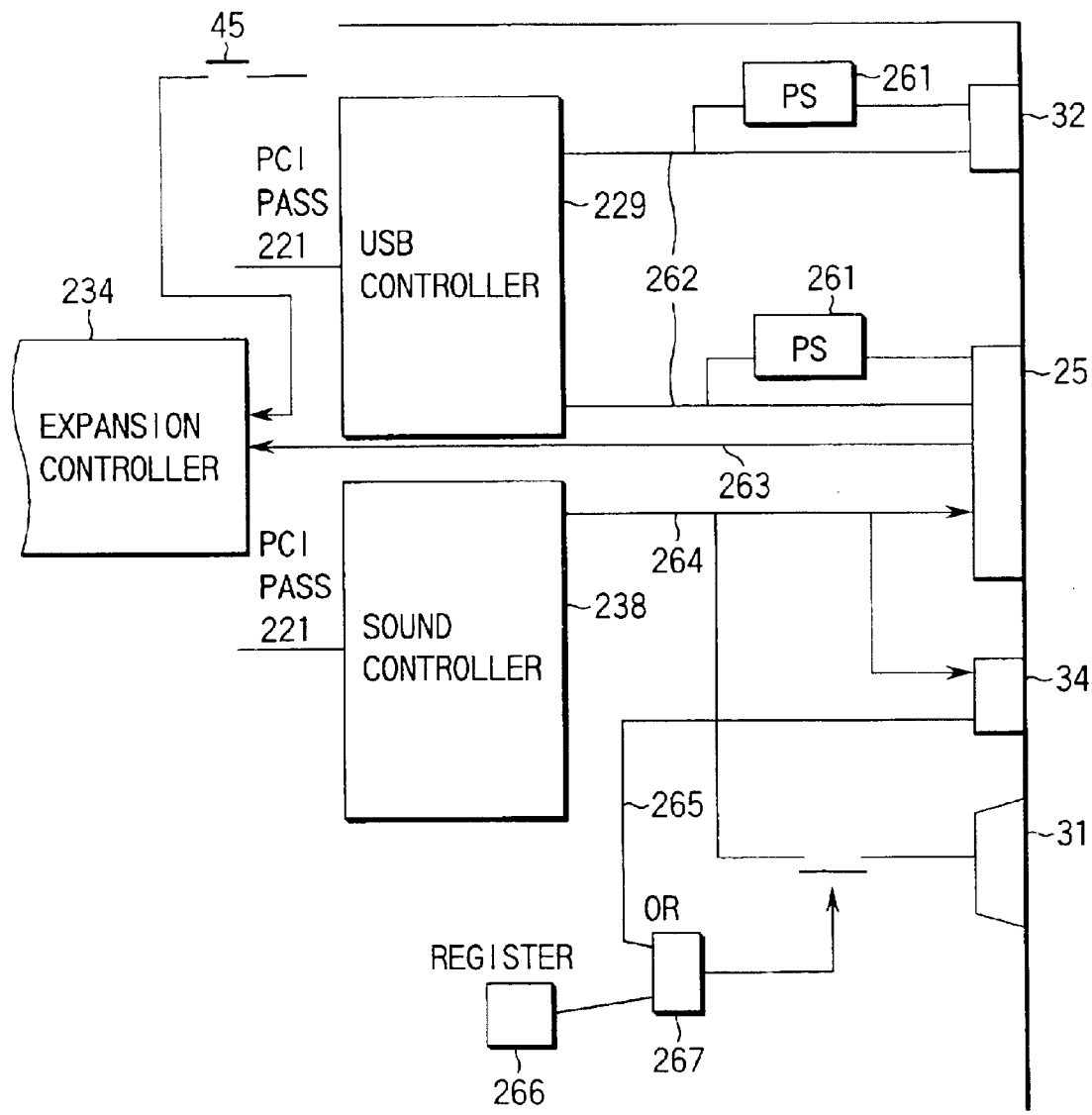

With reference to FIG. 11, the detailed configuration of the PC1 relating to the remote controller connector 25 will be described. Power supply circuits 261 are those for supplying power to USB power supply lines and connected, together with the two signal lines 262 of the USB controller 229, to the standard USB connector 32 and to the connector 25, respectively. The connector 25 is connected to a signal line 263 for notifying the extended controller 234 from the connector 25 that the power supply is switched on. The connector 25 is also connected to a sound signal line 264 from the sound controller 238. This sound signal line 264 corresponds to the right and left sound outputs of an ordinary audio apparatus.

As can be seen, the connector 25 for remote controller connection integrates standard USB lines, the signal indicating that the power supply is switched on and the ordinary sound output. It is noted that each of the USB connector 32 and the connector 25 has a signal line connected to a ground in the PC1.

Ordinary USB terminals include four terminals, i.e., a power supply terminal, a ground terminal and two communication signal terminals, and are connected to external USB devices. A normal audio terminal is connected as three connection terminals, i.e., a left sound output terminal, a right sound output terminal and a ground terminal. A conventional personal computer has the USB terminal and the audio terminal as independent connectors.

Figures 12A, 12B:
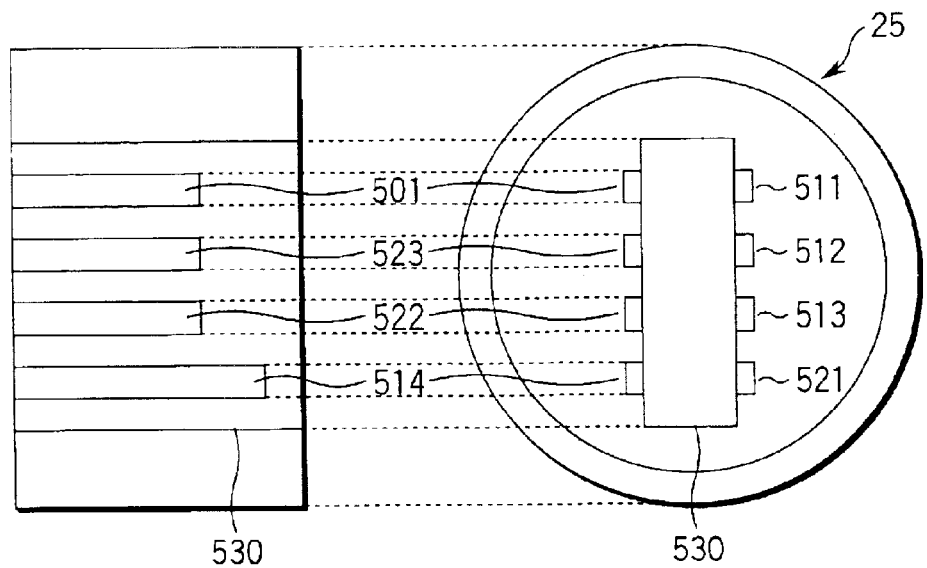
FIG. 12A is a side view of a remote controller connector.
FIG. 12B is a plan view of the remote controller connector.
Figure 13:
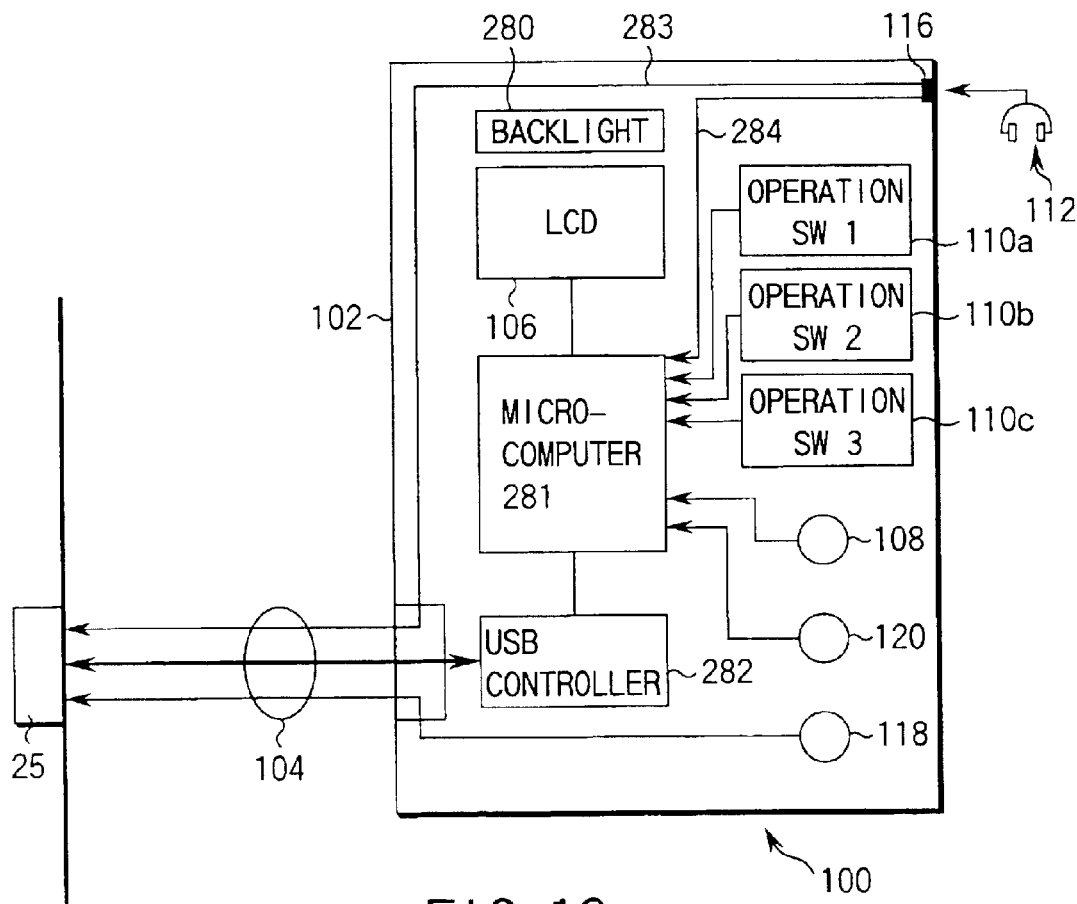

According to the present embodiment, by contrast, the connector 25 has those USB terminals, audio terminals and further a power supply terminal as shown in FIGS. 12A and 12B. A USB power terminal 511, USB communication signal terminals 512 and 513 and an audio ground terminal 521 are arranged on one surface of a substrate 530. A ground terminal 514 for USB is arranged on the rear surface of the substrate. In addition, a left sound output terminal 522 and a right sound output terminal 523 for audio are arranged at positions corresponding to the communication signal terminals 512 and 513 on the rear surface of the substrate 530, respectively. Further, a power supply signal terminal 501 is arranged at a position corresponding to the power terminal 511. That is, the terminals 511 and 521 for the supply of power are arranged outside of the connector 25. The communication and data (sound) transmission terminals 512, 513, 522 and 523 are arranged inside of the connector 25. The power terminal 511 which is a terminal for the supply of power and the ground terminals 521 and 514 are constituted to have longer patterns than those of the other terminals.

As shown in FIG. 11, the sound signal line 264 of the sound controller 238 is connected to the headphone jack 34 and the speaker 31 beside the connector 25 as described above. A signal line 265 for detecting whether or not the headphone is connected to the headphone jack 34, is connected to the headphone jack 34. An ordinary audio apparatus has a function of causing the signal line 265 for detecting whether or not the headphone is connected to the jack 34 to switch on/off a sound signal line to the speaker 31 so as to prevent the speaker 31 from outputting sound when the headphone is connected to the jack 34.

The PC1 in this embodiment needs to detect whether or not the headphone is connected not only to the headphone jack 34 but also to a headphone jack 116 provided at the remote controller 100 to which the headphone is connected through the connector 25, and on/off controls the sound signal line 264 to the speaker 31. Due to this, PC1 has a register 266 to write information about the connection of the headphone jack which information is received-from the remote controller 100 side through the USB. The PC1 also has an OR circuit 267 for outputting H when it receives an H output from either the signal line 265 or the register 266. Using the output of the OR circuit 267, the sound signal line 264 to the speaker 31 is switched on and off. The operation for writing information to the register 266 will be described later.

Meanwhile, the remote controller 100 has a USB controller 282 communicating with the microcomputer 281 and the USB controller 229 of the PC1 as shown in FIGS. 7, 8. and 11. The microcomputer 281 controls the entire remote controller 100. The microcomputer 281 mainly has a function to display information on the liquid crystal display section 106 based on the data received from the PC1 and a function to detect the states of the jog dials 110a, 110b and 110c and the shutter button 108, generate commands and to issue the commands to the PC1 through the USB controller 282 and the cable 104.

A backlight 280 is provided on the rear surface of the liquid crystal display section 106. This backlight is constituted to be put on for only several seconds after one of the switches is operated. A hold switch 120 is provided to invalidate the other switches. When the hold switch is turned on, the microcomputer 281 ignores the change of the states of switches other than the power supply switch 118. Although not shown, a switch circuit may be provided on the signal line of, for example, the power supply switch 118 so that the switch circuit is disconnected when the hold switch 120 is turned on. This makes it possible to invalidate even the power switch 118 when the hold switch 120 is turned on.

A sound signal line 283 connected to the PC1 through the cable 104, passes through the controller main body 102 and is connected to the headphone jack 116. The power supply switch 118 supplies a signal indicating that the power supply is switched on/off to the PC1 through the cable 104 independently of the microcomputer 281 when the switch 118 is turned on.

A signal line 284 indicating whether or not the headphone 112 is connected to the headphone jack 116 is connected to the headphone jack 116. Using this signal line 284, the microcomputer 281 detects whether or not the headphone 112 is connected to the headphone jack 116. The microcomputer 281 generates a predetermined command based on the detection result and notifies the PC1 of the command through the USB controller 282 and the cable 104. The PC1 judges the notification received at the USB controller 229 in a CPU 211 and writes an IO command to the register 266 as stated above. By doing so, it is possible to determine whether or not the headphone is connected to the headphone jack 116 of the remote controller 100.

When the remote controller 100 constituted as stated above is connected to the PC1, the PC1 ad the remote controller 100 are connected to each other by using a certain USB which is a serial signal line and which is capable of two-way transmitting information. Further, the remote controller 100 is provided with a power supply switch 118 for switching on/off the PC1. Thus, the following way to use the system can be considered.

It is assumed that the display unit 12 of the PC1 is closed and the remote controller 100 is connected to the PC1 while the power supply is switched off. In this state, when the power supply switch 118 of the remote controller 100 is turned on, the extended controller 234 of the PC1 is notified that power supply is switched on. The extended controller 234 notifies this to the microcomputer 235. As a result, the PC1 starts operation and executes initialization and OS loading. At this moment, an upper program for remote control and a remote control driver software are also loaded, and a table for interpreting commands transmitted from the remote controller 100 is prepared. The table is to relate commands from the microcomputer 281 in accordance with the actions of the respective switches of the remote controller 100 to commands issued to the upper program.

Further, the remote control driver software receives data displayed on the liquid crystal display section 106 of the remote controller 100, from the upper program and supplies the data to the USB controller 229. The USB controller 229 transmits the data to the remote controller 100 using the connector 25. The remote controller 100 displays the transmitted data on the liquid crystal display section 106 and awaits for a user's operation. When the user performs some switch operation, the microcomputer 281 interprets the operation switch, generates a command and transmits the command to the PC1 using the USB controller 282. The PC1 converts the transmitted command into a command toward the upper program using the above-stated table and notifies the converted command to the upper program.

In the above-stated example, while the display unit 12 of the PC1 is closed and in a non-display state, the PC1 is in a state in which the operation is executed. Therefore, the PC1 having the above-stated remote controller 100 is suited to be used to, for example, indicate an audio file stored in a storage unit, such as the HDD 244 and the smart media 247, using the jog dials of the remote controller and to allow the user to listen to the audio file with the headphone 112 connected to the headphone jack 116 of the remote controller.

As stated above, when the remote controller 100 is connected to the PC1, the PC1 and the remote controller are connected to each other by using a certain USB which is a serial signal line and which is capable of two-way transmitting information. Due to this, it is possible to issue a command from the remote controller 100. Besides, when supplied with display data from the PC1, the remote controller can display the display data and executes interactive operations including the selection of processing based on the display data.

Figure 14:
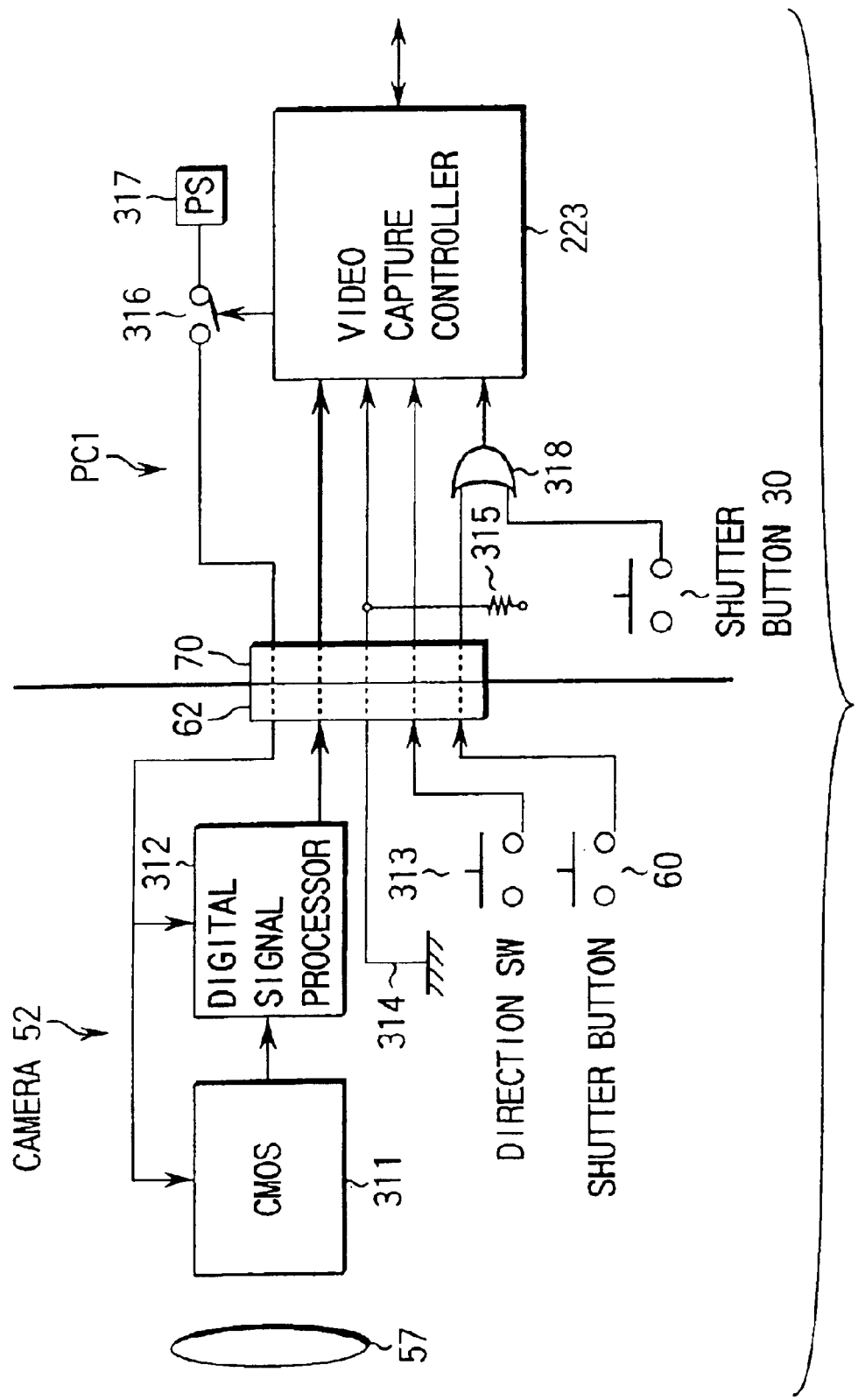
Figure 15:
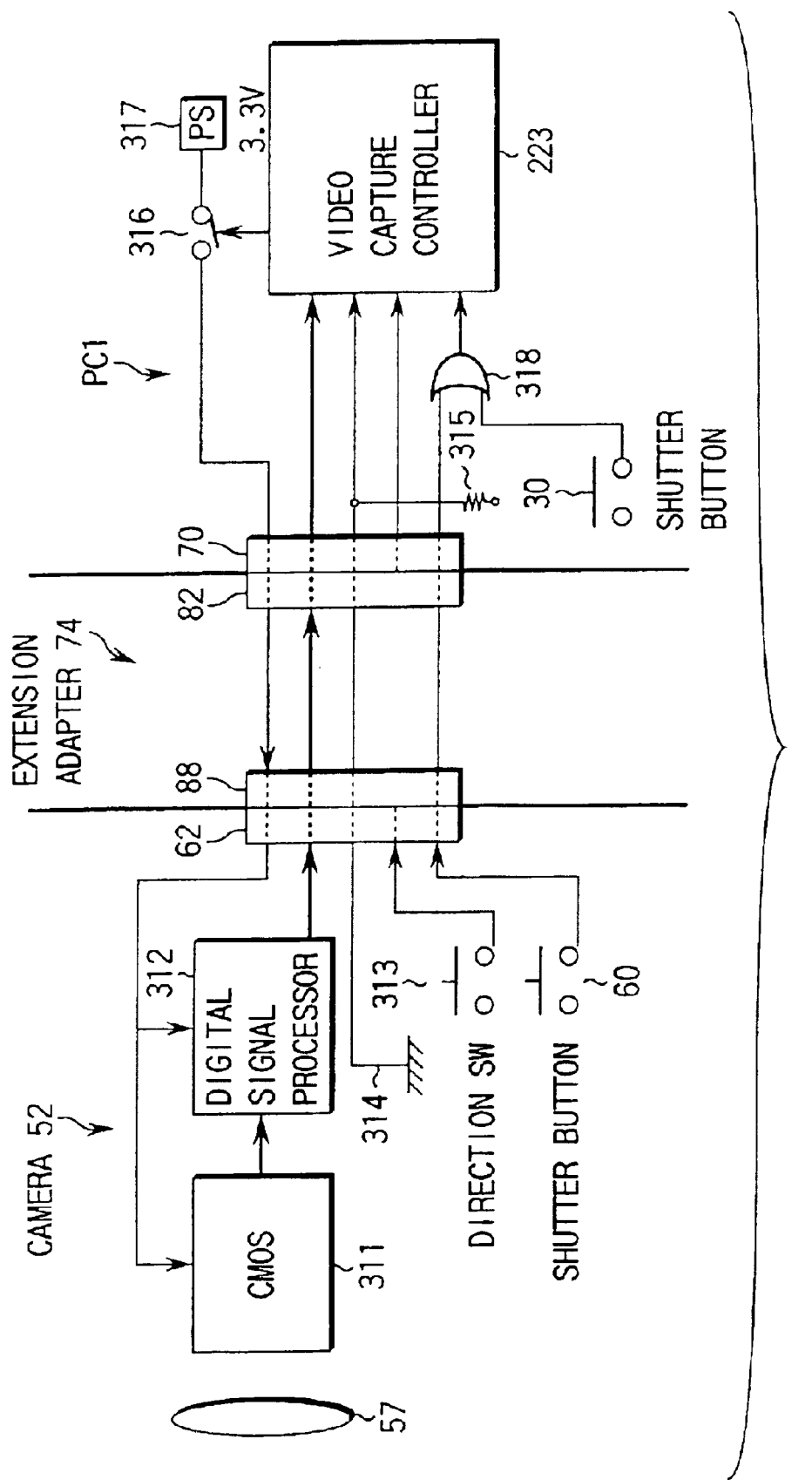

Next, description will be given to the camera 52. As shown in FIG. 14, the camera 52 is directly, electrically connected to the PC1 by connecting the connector 62 to the connector 70 of the apparatus main body 10. As shown in FIG. 15, after the camera 52 is detached from the PC1, the connector 82 of the extension adapter 74 is connected to the connector 70 of the PC1 and the other connector 88 of the extension adapter is indirectly connected to the connector 62 of the camera 52. By doing so, the camera 52 can be indirectly connected to the PC1 trough the extension adapter. In this case, signal lines other than a direction switch 113 which will be described later in the camera 52 are electrically connected to the PC1.

A CMOS sensor 311 provided in the camera 52 captures image data input through the lens 57 as image information, which information is subjected to processing by a digital signal processor 312 and transmitted to the PC1.

When the camera main body 54 is rotated toward the rear surface side of the PC1 while the camera 52 is directly connected to the PC1, the image data captured by the camera 52 is turned upside down. Due to this, the direction switch 313 is provided in the camera 52. The direction switch 313 is preferably switched when the camera main body 54 exceeds a position at a predetermined angle, e.g., about 60 degrees (which position is directed upward in perpendicular direction to the upper surface of the apparatus main body 10).

When the camera 52 is directly connected to the PC1, the on/off state of the direction switch 313 is supplied to a video capture controller 223 in the PC1. However, when the camera 52 is indirectly connected to the PC1 using the extension adapter 74, the direction switch 313 is not connected to the video capture controller 223 and the state of the direction switch 313 is not supplied to the video capture controller 223. This is intended to improve the disadvantage that when the extension adapter 74 is employed, an ordinary user operates the camera flexibly with the camera 52 held by the user's hand and the vertical direction of the image is changed according to the direction switch 313 to thereby deteriorate operability.

When either the shutter button 60 of the camera 52 or the shutter button 30 of the PC1 is depressed, the user is notified that the button is depressed to the video capture controller 223 through the OR circuit 318. As already stated above, while the camera 52 is directly connected to the PC1, the shutter button 60 of the camera 52 is positioned inside of the apparatus main body 10 and cannot be operated externally, so that it is possible to prevent erroneous operation.

Further, the camera 52 is provided with a ground 314, causes the video capture controller 223 to detect whether or not a voltage is applied from a pull-up resistor 315 in the PC1 and checks whether or not the camera is connected to the PC1. By arranging the ground 314 at the camera 52 side, it is possible to precisely determine whether or not the camera 52 is connected to the PC1 irrespectively of whether the camera is connected thereto directly or indirectly. The video capture controller 223 detects whether or not the camera 52 is connected to the PC1, turns on/off the switch 316 in response to the detection result and connects a power supply 317 to the camera 52.

When the camera 52 is connected to the PC1, whether video data picked up by the camera 52 is captured into the PC1 or not depends on the setting of the video capture controller 223 by the application program of the PC1 main body. For example, whether or not every time the shutter buttons 30 and 60 are depressed, image data at that time is captured into the PC1 or after the shutter button is depressed, whether or not the image data are continuously captured thereinto until the shutter button is depressed the next time, is defined by the setting made by the application program.

According to the personal computer constituted as. stated above, the camera 52 for imaging an object is arranged at the central portion on the rear end of the apparatus main body 10 and positioned between the paired hinge portions 40. When the camera 52 is provided at the apparatus main body 10 in this way, the camera 52 is not moved even when the display unit 12 is opened/closed and the image pickup range of the camera does not need to be adjusted according to the opening/closing angle of the display unit 12. Thus, operability can be improved.

Further, since the camera 52 is connected to the printed circuit board provided in the apparatus main body 10 through the connector, wirings extending from the camera 52 need not be led into the apparatus main body through the hinge portions from the display unit as seen in a case where the camera is provided at the display unit. Thus, assembly efficiency can be improved and efficiency for using the space can be also improved. When the camera 52 is arranged, in particular, between the hinge portions 40 which tend to be conventionally dead space, it is possible to further improve the efficiency for using the space, to provide a smaller personal computer and to increase the degree of design freedom.

Moreover, since the camera 52 is provided at the central portion on the rear end of the apparatus main body 10, it is positioned in front of the personal computer user. Thanks to this, even when the user is photographed by the camera 52 while input operation for the personal computer is being performed by using the keyboard 20, it is not necessary to move the entire personal computer according to the user who is an object, thereby making it possible to improve operability.

Meanwhile, according to the personal computer stated above, the camera 52 is detachably attached to the apparatus main body 10. Due to this, when the camera is detached from the apparatus main body and then connected to the apparatus main body using the extension adapter 74, the camera can be used as a handy camera and put at a remote position from the apparatus main body. This allows the camera 52 to be put closer to the object and to direct and arrange only the camera in an arbitrary direction without changing the direction of the personal computer.

In that case, while the display unit 12 of the personal computer monitors the object, a snap image can be taken by the shutter button 30 of the apparatus main body 10 if necessary and a snap image can be also taken by the shutter button 60 of the camera 52. It is, therefore, possible to use the personal computer as a system in more varied ways and to enlarge the application range of the computer thanks to the multifunction of the computer.

Further, according to the personal computer stated above, the personal computer can be remote-controlled by connecting the remote controller 100 to the computer. That is to say, by operating the jog dials provided at the controller main body 102, applications and the like can be executed at a distant position from the personal computer. For example, while the personal computer provided with the camera 52 is positioned near an object, the photographing, snap shot or the like of the object can be executed from the remote position by the remote controller 100. Alternatively, when a user intends to listen to music with the media player or the like of the personal computer, it is possible to listen to music by operating the remote controller 100 with the personal computer put in, for example, a bag by connecting the headphone 112 to the controller main body 102. Thus, the operability of the personal computer can be improved, the personal computer can be utilized as a system in varied manners and the application range of the personal computer can be further enlarged.

Moreover, when both the remote controller 100 and the extension adapter 74 are used, the camera 52 is arranged closer to an object and remote-controlled by the remote controller 100. By doing so, the camera 52 and the personal computer can be operated at a position quite remote from the object, the improvement of operability and further enlargement of the application range of the personal computer can be realized.

It is noted that the present invention should not be limited to the above-stated embodiment and that various modifications can be made within the scope of the present invention. For example, the functions of the remote controller are not limited to those in the above-described embodiment but can be modified in various manners if necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus system comprising:
    an electronic apparatus including
        an apparatus main body having a rear end portion provided with a pair of hinge portions, a camera attachment portion provided between the hinge portions, and a main body-side connector provided at the camera attachment portion,
        a display unit rotatably supported by the hinge portions,
        a camera detachably provided at the camera attachment portion, the camera including a base portion fitted to the camera attachment portion, a camera-side connector connected to the main body side connector, and a camera main body having a lens and supported by the base portion, and
        an extension adapter for connecting the camera detached from the camera attachment portion to the apparatus main body, and arranging the camera to be remote from the apparatus main body.

2. An electronic apparatus system according to claim 1, wherein the extension adapter includes a main body-side adapter which is capable of being attached, instead of the camera, to the camera attachment portion, a camera-side adapter to which the camera detached from the apparatus main body is to be attached, and a connection cable mutually connecting the main body-side adapter and the camera-side adapter.

3. An electronic apparatus system according to claim 2, wherein the apparatus main body has a guide section for guiding attachment/detachment of the camera and the main body-side adapter to and from the camera attachment portion; the camera has a holding member for engaging with the apparatus main body so as to detachably hold the camera in the camera attachment portion when the camera is attached to the camera attachment portion, and for engaging with the camera-side adapter so as to detachably hold the camera in the camera-side adapter when the camera is attached to the camera-side adapter.

4. An electronic apparatus system according to claim 3, wherein the main body-side adapter has a first adapter-side connector which is to be connected to the main body-side connector when the main body-side adapter is attached to the camera attachment portion, and a holding member for engaging with the apparatus main body so as to detachably hold the main body-side adapter in the camera attachment portion when the main body-side adapter is attached to the camera attachment portion; and the camera-side adapter has a guide section for guiding attachment/detachment of the camera, and a second adapter-side connector to which the camera-side connector is connected when the camera is attached to the camera-side adapter.

5. An electronic apparatus system according to claim 2, wherein the extension adapter is provided with a tripod detachably attached to the camera-side adapter.

6. An electronic apparatus system according to claim 1, wherein the camera comprises a substantially cylindrical camera main body having a lens provided on an outer periphery, and a base portion rotatably supporting the camera main body about a central axis of the camera main body; and the camera is attached to the apparatus main body while the central axis of the camera main body is substantially coaxial with the rotation axis of the display unit.

7. An electronic apparatus system according to claim 1, wherein the apparatus main body comprises an upper surface portion provided with a keyboard, and an independent shutter button provided at the upper surface portion between the keyboard and the hinge portions; and the camera has a camera-side shutter button.

8. An electronic apparatus system according to claim 7, wherein the camera-side shutter button is arranged at a position at which the camera-side shutter button is concealed in the apparatus main body when the camera is attached to the camera attachment portion of the apparatus main body.

9. An electronic apparatus system according to claim 1, wherein the camera is rotatable between a position at which the camera faces a front side of the apparatus main body and a position at which the camera faces a rear side of the apparatus main body, in a range of about 180 degrees; the camera has a direction sensor for detecting that the camera has been rotated to a predetermined rotation position; and the apparatus main body has a control section for turning image data picked up by the camera upside down according to the detection of the direction sensor while the camera is directly connected to the apparatus main body.

10. An electronic apparatus system according to claim 9, wherein the extension adapter is formed to turn the direction sensor and the control section into a non-connection state when the camera is connected to the apparatus main body through the extension adapter.

11. An electronic apparatus system according to claim 1, wherein the apparatus main body has a pull-up voltage circuit; and the camera has a ground terminal connected to the pull-up voltage circuit through a signal line when the camera is connected directly to the apparatus main body or connected to the apparatus main body through the extension adapter.

12. An electronic apparatus system according to claim 1, which further comprises a remote controller detachably connected to the apparatus main body, for remote-controlling the electronic apparatus.

13. An electronic apparatus system according to claim 12, wherein the remote controller comprises a controller main body, and a connection cable extending from the controller main body and having an extended end detachably connected to the apparatus main body; and the controller main body comprises a plurality of operation dials for selecting and determining operation functions and operation modes of the electronic apparatus, and a display section for displaying an item selected and determined by the plurality of operation dials.

14. An electronic apparatus system according to claim 13, wherein the controller main body comprises a connection terminal connectable with a headphone.

15. An electronic apparatus system according to claim 12, wherein the remote controller comprises a shutter button provided at the controller main body.

16. An electronic apparatus according to claim 12, further comprising a remote controller connected to the apparatus main body, and wherein the camera shutter is provided at the remote controller.

17. An electronic apparatus system comprising:
an electronic apparatus comprising:
an apparatus main body having a rear end portion provided with a pair of hinge portions;
a display unit rotatably supported by the hinge portions;
a camera detachably provided at a central portion of a rear end of the apparatus main body and positioned between the pair of hinge portions; and
a remote controller detachably connected to the apparatus main body, for remote-controlling the electronic apparatus, the remote controller including an extended end detachably connected to the apparatus main body, a controller main body having a plurality of operation dials for selecting and determining operation functions and operation modes of the electronic apparatus, a connection cable extending from the controller main body, and a display section displaying an item selected and determined by the plurality of operation dials.

18. An electronic apparatus system according to claim 17, wherein the remote controller includes a shutter button provided at the controller main body.

19. An electronic apparatus system comprising:
an apparatus main body having a rear end portion provided with a pair of hinge portions, and an independent shutter button,
a display unit rotatably supported by the hinge portions, and
a camera detachably provided at a central portion of a rear end of the apparatus main body and positioned between the pair of hinge portions, the camera having a camera-side shutter button arranged at a position at which the camera-side shutter button is concealed in the apparatus main body when the camera is attached to the apparatus main body; and
an extension adapter for connecting the camera detached from the apparatus main body to the apparatus main body, and arranging the camera to be remote from the apparatus main body.

20. An electronic apparatus comprising:
an apparatus main body having a rear end portion provided with a pair of hinge portions, a camera attachment portion provided between the hinge portions, and a main body side connector provided at the camera attachment portion;
a display unit rotatably supported by the hinge portions;
a camera provided at the camera attachment portion, and configured to pick up an image of an object; and
wherein the camera includes a base portion detachably fitted to the camera attachment portion and having a camera-side connector that is connected to the main-body side connector, and a camera main body having a lens and supported by the base portion to be rotatable about a central axis of the camera main body substantially coaxial with a rotation axis of the display unit.

* * * * *